United States Patent [19]
Hirama et al.

[11] Patent Number: 5,951,106
[45] Date of Patent: Sep. 14, 1999

[54] ROTATABLE VEHICLE SEAT ASSEMBLY WITH IMPROVED LATCHING MECHANISM

[75] Inventors: Yasuo Hirama; Toshio Shiina; Kouichi Takatsuji; Masayuki Tsunoda, all of Kanagawa; Yoshihiko Yamauchi, Yokohama; Yoshiaki Ezuka, Kanagawa; Toru Kondo, Kanagawa; Masami Yonekura, Kanagawa, all of Japan

[73] Assignees: Ikeda Bussan Co., Ltd., Ayase; Nissan Motor Co., Ltd., Yokohama, both of Japan

[21] Appl. No.: 08/928,439

[22] Filed: Sep. 12, 1997

[30] Foreign Application Priority Data

Sep. 13, 1996 [JP] Japan .................................. 8-265168
Sep. 13, 1996 [JP] Japan .................................. 8-265169

[51] Int. Cl.$^6$ ........................................................ A47C 1/06
[52] U.S. Cl. ................................ 297/344.22; 297/344.24
[58] Field of Search ........................ 297/344.23, 344.24, 297/344.26, 344.22

[56] References Cited

U.S. PATENT DOCUMENTS

| | | | |
|---|---|---|---|
| 3,821,825 | 7/1974 | Bailey | 297/344.24 X |
| 4,122,571 | 10/1978 | Moeser | 297/344.24 X |
| 4,487,452 | 12/1984 | Tanizaki et al. | 297/344.26 X |
| 4,570,997 | 2/1986 | Tanizaki et al. | 297/344.24 |
| 4,802,706 | 2/1989 | Onimaru et al. | 297/344.23 X |
| 4,969,685 | 11/1990 | Chihaya et al. | 297/344.23 |
| 5,000,505 | 3/1991 | Kawashita et al. | 297/344.23 X |

*Primary Examiner*—Peter M. Cuomo
*Assistant Examiner*—Stephen Vu
*Attorney, Agent, or Firm*—Foley & Lardner

[57] ABSTRACT

A vehicle front seat of the kind capable of being selectively rotated into a forward position or rearward position has a turntable unit or rotation adjusting mechanism provided between the seat and a vehicle floor. The rotation adjusting mechanism includes a stationary circular guide and a rotating disk disposed inside the stationary guide. The rotating disk is provided with a latching arm having an engagement tooth. The stationary guide has a locking through hole for engagement with the engagement tooth of the latching arm. A cam is disposed inside the locking through hole and capable of contacting the engagement tooth inserted into the locking through hole. The cam is rotatable in response to movement of the engagement tooth. An amount of rotation of the cam is detected by a microswitch. The cam is provided with first and second circular arc cam surfaces and capable of absorbing possible errors in attached positions of the constituent parts of the rotation adjusting mechanism.

22 Claims, 4 Drawing Sheets

ROTATABLE VEHICLE SEAT ASSEMBLY WITH IMPROVED LATCHING MECHANISM

BACKGROUND OF THE INVENTION

1. Field of the Invention

The present invention relates to a vehicle seat capable of turning or rotating on a floor of a vehicle cabin or passenger compartment and particularly to a rotatable front seat for use in passenger cars such as recreational vehicles or leisure vehicles.

2. Description of the Related Art

Generally, a front side seat or front seat for passenger cars or the like is capable of sliding forward and rearward of the vehicle but incapable of turning or rotatable horizontally on a vehicle floor.

However, in recent leisure vehicles or recreational vehicles, it is desired for a front seat to be capable of turning or rotating so that the front seat can be positioned opposite to a rear seat in order to obtain a large space for comfort therebetween at the time of stoppage or parking of the vehicle.

Such a rotatable front seat can be obtained with ease by disposing a rotatable support or rotating mechanism between a seat cushion or seating portion of the vehicle seat and a slider.

In case the rotating mechanism is incorporated in the vehicle front seat as described above, it is inevitable for the safety driving that the vehicle can be started to run only when the driver's seat faces forward. To this end, it is necessary to detect that the driver's seat is locked in a standard forward position and permit movement of a shift lever from a parking position to another gear position. A proximity sensor or the like is used for detecting whether the driver's seat is in a standard forward position. However, since the attached position of the proximity sensor or the like and the standard forward position can be erratic, there is a possibility that the standard position cannot be detected with high accuracy and it can possibly be judged that the seat is not in the standard position though it is actually locked in the standard position or the seat is in the standard position though the seat is actually not yet rotated into the standard position.

By such an erroneous judgement, there is caused the following problem, i.e., in case a judgment that the seat is not in the standard position is made though it is actually locked in the standard position, it becomes impossible to start driving or running of the vehicle. On the contrary, in case a judgment that the seat is locked in the standard position though it is actually not yet rotated into the standard position, it becomes possible to start driving or running of the vehicle though the driver's seat is in an unstable condition.

SUMMARY OF THE INVENTION

According to an aspect of the present invention, there is provided a novel and improved vehicle seat assembly that comprises a base on a vehicle floor, a seat and a rotatable support interposed between the seat and the base for rotatably supporting the seat on the base. The rotatable support includes a stationary member in a fixed relation to the base, a rotatable member rotatable relative to the stationary member and secured to the seat for rotation therewith, a latching mechanism provided to one of the stationary member and the rotatable member and having an engagement tooth, the other of the stationary member and the rotatable member having a locking engagement portion that is engageable with the engagement tooth of the latching mechanism only when the seat is in a predetermined position, a cam movable in accordance with an engagement condition under which the locking engagement portion and the engagement tooth of the latching mechanism are engaged with each other, and a detecting unit for detecting the engagement condition based on an amount of movement of the cam.

By this aspect, the engagement condition under which the engagement tooth of the latching mechanism and the locking engagement portion are engaged with each other is detected by the detecting unit by way of the cam. Thus, even when the engagement condition of the engagement tooth and the locking engagement portion is influenced by the positional errors in attachment or arrangement of the latching mechanism and so on, such positional errors in attachment or arrangement can be absorbed by the cam, thus enabling the detecting unit to detect the locked condition of the seat accurately without being affected by the positional errors in attachment or arrangement.

According to another aspect of the present invention, the engagement tooth of the latching mechanism is engageable in the locking engagement portion only when the seat is in a predetermined forward position.

By this aspect, the standard forward position of the seat can be detected accurately and therefore confirmation of the safety at the time of starting of the vehicle can be made assuredly.

According to a further aspect of the present invention, the detecting unit comprises a microswitch having an actuating element, the cam being rotatable about a pivot and having a first circular arc cam surface capable contacting the actuating element of the microswitch but incapable of actuating the microswitch even when brought into contact with the actuating element, a second circular arc cam surface for actuating the microswitch when brought into contact with the actuating element, an inclined cam surface located between the first and second circular arc cam surfaces, and an engagement cam surface for contact with the engagement tooth of the latching mechanism, the second circular arc cam surface being brought into contact with the actuating element of the microswitch only when the engagement tooth inserted into the locking engagement portion assumes a position between its maximally inserted position and its minimally inserted position.

By this aspect, by suitably setting the positional relationship among the first circular arm cam surface, the second circular arm cam surface and the engagement cam surface for engagement with the engagement tooth of the latching mechanism, the actuating element of the microswitch can be operated accurately even when the amount of insertion of the engagement tooth into the locking engagement portion varies from maximum to minimum, thus making it possible to attain accurate detection of the lock condition under which the engagement tooth is locked in the locking engagement portion.

According to a further aspect of the present invention, there is provided a novel and improved vehicle seat assembly that comprises a base on a vehicle floor, a seat, a rotatable support interposed between the seat and the base for rotatably supporting the seat on the base, the rotatable support including a stationary member in a fixed relation to the base, a rotatable member rotatable relative to the stationary member and secured to the seat for rotation therewith, a latching mechanism provided to one of the stationary member and the rotatable member and having an engagement tooth, the other of the stationary member and the rotatable member having a locking engagement portion that is engageable with the engagement tooth of the latching mechanism only when the seat is in a predetermined position, and a locking mechanism for locking the latching mechanism in a condition where the engagement tooth is engaged in the locking engagement portion.

By this aspect, the locked condition of the seat can be detected by reference to the engagement condition under which the engagement tooth of the latching mechanism and the locking engagement portion are engaged with each other. Further, the latching mechanism can be locked in a condition where the engagement tooth is engaged in the locking engagement portion, by means of the locking mechanism, so the engagement tooth of the latching mechanism can be assuredly held engaged with the locking engagement portion.

According to a further aspect of the present invention, the locking mechanism is actuated to lock the latching mechanism when a shift lever is shifted from a parking position to a drive gear position.

By this aspect, when the shift lever is shifted from a parking position to a drive gear position to start driving or running of the vehicle, the locking mechanism is actuated to lock the latching mechanism in a condition where the engagement tooth is engaged in the locking engagement portion, thus making it possible to assure the locked condition of the seat.

According to a further aspect of the present invention, the locking mechanism comprises a spring offset type electromagnetic solenoid and is operative to lock the latching mechanism when the solenoid is energized.

By this aspect, the latching mechanism can be locked only by controlling the energization of the solenoid, thus making it possible to simplify the structure.

The above structure is effective for solving the above noted problems inherent in the prior art assembly.

It is accordingly an object of the present invention to provide a novel and improved vehicle seat assembly that can detect a locked condition of a seat accurately assuredly without being affected by positional errors in attachment or arrangement of constituent parts for detection of the locked condition.

It is a further object of the present invention to provide a novel and improved vehicle seat assembly of the foregoing character that is quite useful for safety driving of a vehicle.

DETAILED DESCRIPTION OF THE REFERRED EMBODIMENT

Figure 1:
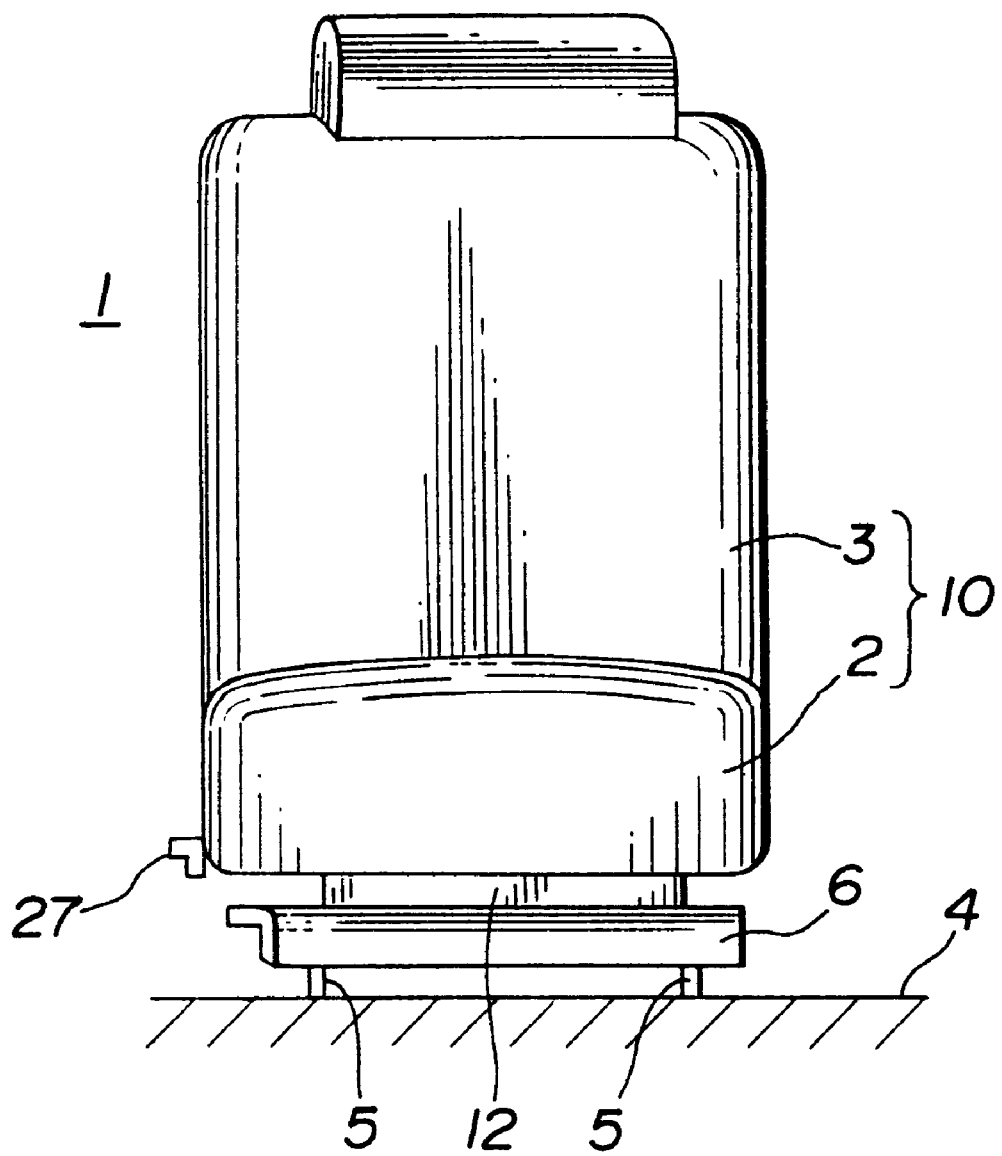
FIG. 1 is a schematic elevation of a vehicle seat assembly according to an embodiment of the present invention.

Referring to FIGS. 1 to 5 inclusive, a preferred embodiment of the present invention will be described. In FIG. 1, a rotatable vehicle seat assembly according to an embodiment of the present invention is generally indicated by 1 and shown as a separate type front seat assembly for use in a passenger car or the like.

As shown in FIG. 1, the rotatable vehicle seat assembly 1 includes a seat 10 comprised of at least a seat cushion or seating portion 2, a seat back portion 3, and a reclining mechanism (not shown). The seat assembly 10 includes on a vehicle floor 4 a base consisting of a pair of guide rails 5 elongated forward and rearward of the vehicle and a slider 6 capable of sliding on the guide rails 5. The seat 10 is rotatably supported on the base by way of a rotation adjusting mechanism or rotatable support 12. By this, the seat 10 is capable of rotating while sliding on the vehicle floor 4.

Figure 2:
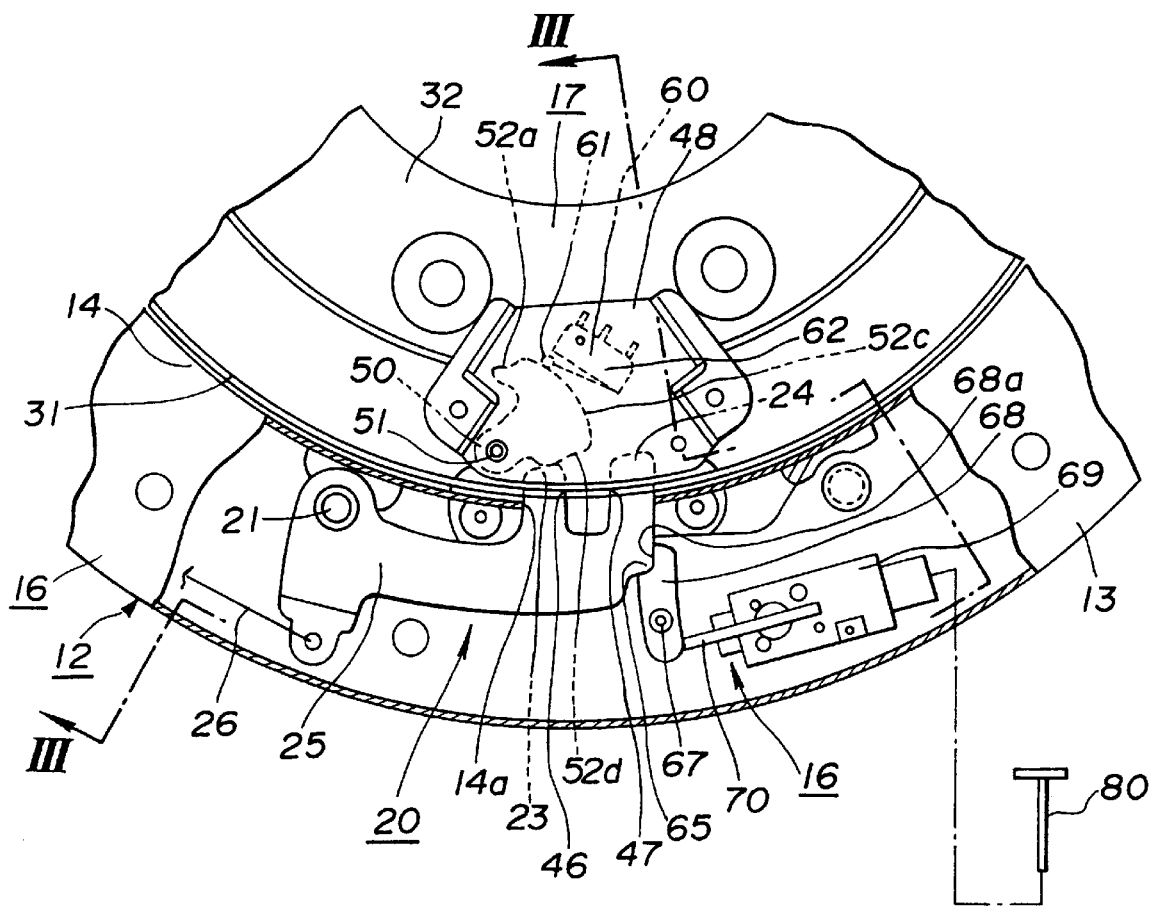
FIG. 2 is a plan view of a principal portion of a rotatably support or a rotation adjusting device incorporated in the vehicle seat assembly of FIG. 1.
Figure 3:
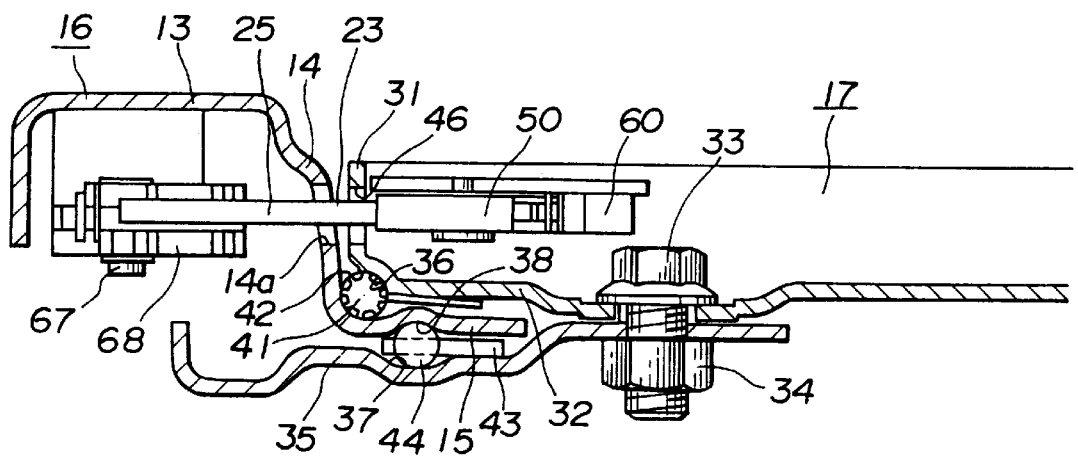
FIG. 3 is a sectional view taken along the line III—III of FIG. 2.

As shown in FIGS. 2 and 3, the rotation adjusting mechanism 12 is constructed of a rotatable member or rotating disk 16 having a horizontal plate portion 13, a tubular portion 14 projecting downward from an inner circumferential periphery of the horizontal plate portion 13, and a flange portion 15 projecting radially inward from a lower end of the tubular portion 14, and a stationary member or guide 17 rotatably supporting the flange portion 15 of the rotating disk 16 by way of balls or rotating elements 42 and 44.

In this connection, the rotating disk 16 is provided with, at a front side portion and a rear side portion thereof, latching mechanisms 20 for holding the seat 10 in a forward position and a rearward position, respectively, though only one latching mechanism is shown. The latching mechanisms 20 are disposed symmetrical about an axis of rotation of the stationary guide 17, and description will be made with respect to the latching mechanism 20 for holding the seat 10 in a forward position.

The latching mechanism 20 includes a pivot 21 attached to the rotating disk 16 to project downward from the lower surface thereof and a latching arm 25 installed rotatably on the pivot 21 and formed with teeth 23 and 24, which are engaged in locking engagement holes 46 and 47 formed in the stationary guide 17 (i.e., a locking engagement portion of the stationary guide 17) when the seat 10 is rotated into a standard or predetermined forward position, i.e., a predetermined position where the seat 10 faces forward of the vehicle. The latching arm 25 is urged by a spring (not shown) toward the stationary guide 17.

The latching arm 25 is connected to, for example, a lock release lever 27 (see FIG. 1) so that by turning the lock release lever 27 the latching arm 25 is rotated or turned against the bias of the spring (not shown) in the direction to move apart from the stationary guide 17 and is released from a latched condition, i.e., from a condition of its teeth 23 and 24 being engaged in the locking engagement holes 46 and 47, respectively.

As shown in FIG. 3, the stationary guide 17 is constructed of a tubular portion 31 disposed adjacently inside of the tubular portion 14 of the rotating disk 17, a circular bottom portion 32 extending inward from the lower end of the tubular portion 31, and an annular plate portion 35 attached with bolts 33 and nuts 34 to the lower side of the circular plate portion 32 and extending radially outward in a way as to interpose the flange portion 15 of the rotating disk 16 between the circular plate portion 32 and the annular plate portion 35.

A ball receiving depression 36 is formed at the junction between the tubular portion 31 and the circular bottom portion 32 of the stationary guide 17, i.e., at the corner portion of same, while an annular ball receiving depression 37 is formed in the annular plate portion 35 at a location radially inward of the ball receiving portion 36 of the circular bottom portion 32. Further, an annular ball receiving depression 38 is formed in the flange portion 15 of the rotating disk 16 at a location thereof corresponding to the ball receiving depression 37.

A number of balls or rotating elements 42, which are held with predetermined intervals by means of a retainer 41, are disposed in an annular space defined by the joining portion between the tubular portion 14 and the flange portion 15 of the rotating disk 16 and by the ball receiving depression 36 of the stationary guide 17, while a number of balls or rotating elements 44, which are held with predetermined intervals by means of a retainer 43, are disposed in an annular space defined by the ball receiving depressions 37 and 38. By those rotating elements 42 and 44, the rotating disk 16 is held rotatable relative to the stationary guide 17.

As described above, the tubular portion 31 of the stationary guide 17 is formed with the through holes 46 and 47 at locations corresponding to or opposing to the teeth 23 and 24 of the latching arm 25 when the seat 10 is in a standard forward position.

On the other hand, a cover bracket 48 is held stationary on the stationary guide 17 at close proximity to the inner circumferential side of the tubular portion 31 thereof, and a cam 50 is pivotally mounted on the cover bracket 48 by means of a pivot 51 and at location corresponding to the tooth 23 of the latching arm 25.

Figure 4:
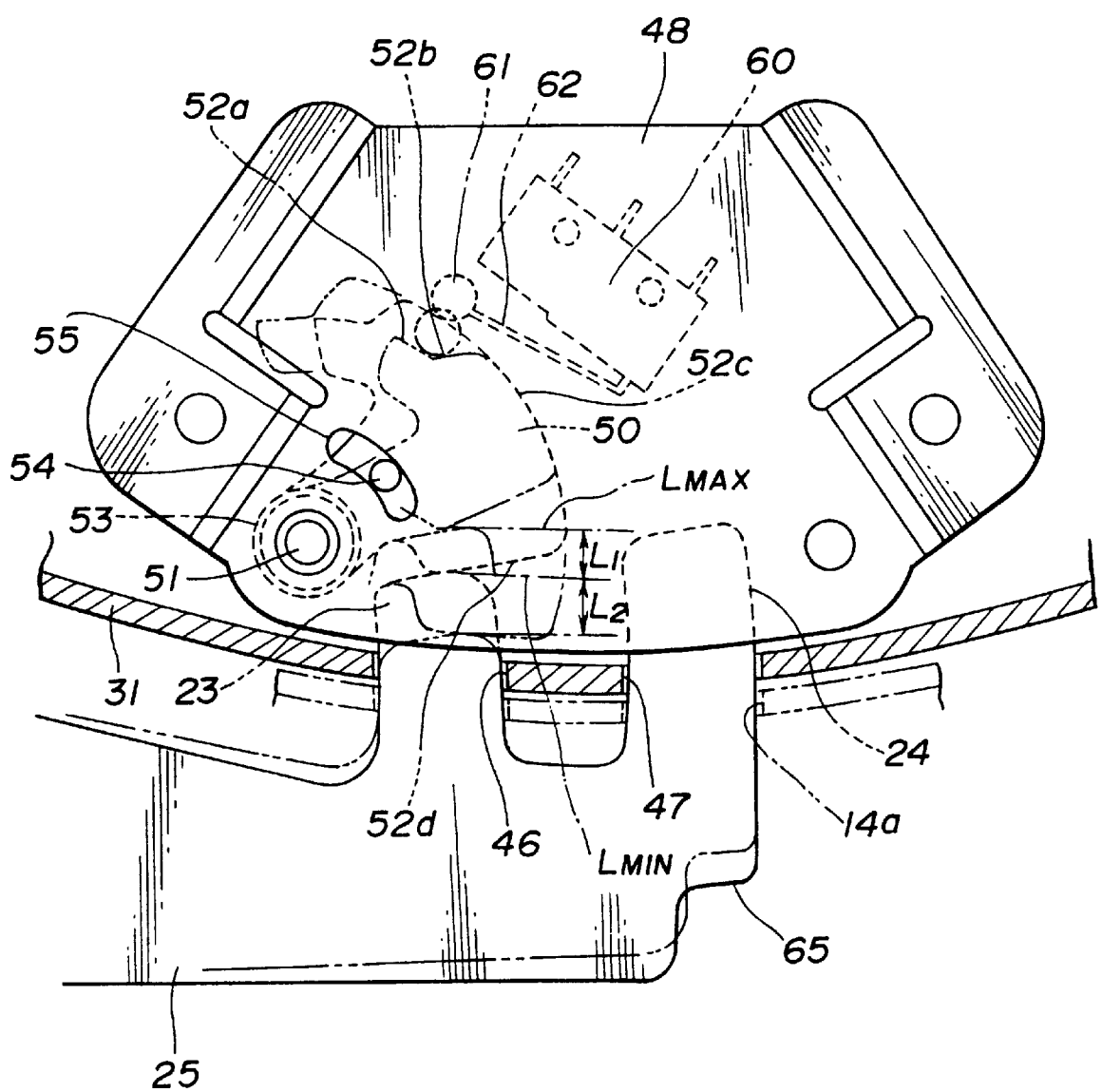
FIG. 4 is an enlarged view of a portion of the rotation adjusting mechanism of FIG. 2.

As shown in FIG. 4, the cam 50 is generally fan-shaped and has at its outer periphery a first circular arc cam surface 52a of a relatively small radius, a second circular arc cam surface 52c of a radius larger than that of the first cam surface 52a, an inclined cam surface 52b located between the first and second arcuate cam surfaces 52a and 52c, and an engagement surface 52d extending from the right-hand end of the second circular arc cam surface 52c toward the pivot 51 and located in opposition to the engagement tooth 23 of the latching arm 25 so as to be engageable in the tooth 23. The circular arcs of the first and second circular arc cam surfaces 52 and 52c have a center coinciding with the center axis of the pivot 51.

The cam 50 is urged against the tooth 23 of the latching arm 25 by means of a return spring 53, which is disposed around the pivot 51, and has on its upper surface a guide pin 54, which is engaged in an arcuated hole 55 to limit the extend of rotation of the cam 50.

A microswitch 60, which constitutes part of a detecting unit, is disposed on the cover bracket 48 at location opposing to the cam surfaces 52a to 52c of the cam 50.

The microswitch 60 has an actuating element 62 having at an end thereof an engagement roller 61. The engagement roller 61 is brought into contact with the cam surfaces 52a to 52c.

The positional relationship of the cam surfaces 52a to 52c of the cam 50 with respect to the engagement tooth 23 of the latching arm 25 and the microswitch 60 are such that when the engagement surface 52d is positioned in response to a minimally inserted position $L_{MIN}$ of the engagement tooth 23 the second circular arc cam surface 52c is brought into contact with the engagement roller 61 of the microswitch 61 to bend the actuating element 62 against its resilience and switching the microswitch 60 into a detected or ON condition. This condition continues until the engagement tooth 23 is inserted through the hole 46 into a maximally insertion position $L_{MAX}$, i.e., in the range indicated by L1 in FIG. 4.

When the engagement surface 52d is in a position nearer to the tubular portion 31 than that in which it is put in response to the minimally inserted position $L_{MIN}$, i.e., in the range indicated by L2 in FIG. 4, the inclined cam surface 52b is brought into contact with the engagement roller 61 to put the microswitch 60 into either of an ON condition or an OFF condition, i.e., into an unstable condition. When the tooth 23 is located in such a position where the amount of its insertion is small so as not to be included in the range L2, the engagement roller 61 is brought into contact with the circular arc cam surface 52a, placing the microswitch 60 into an undetected or OFF condition.

Figure 5:
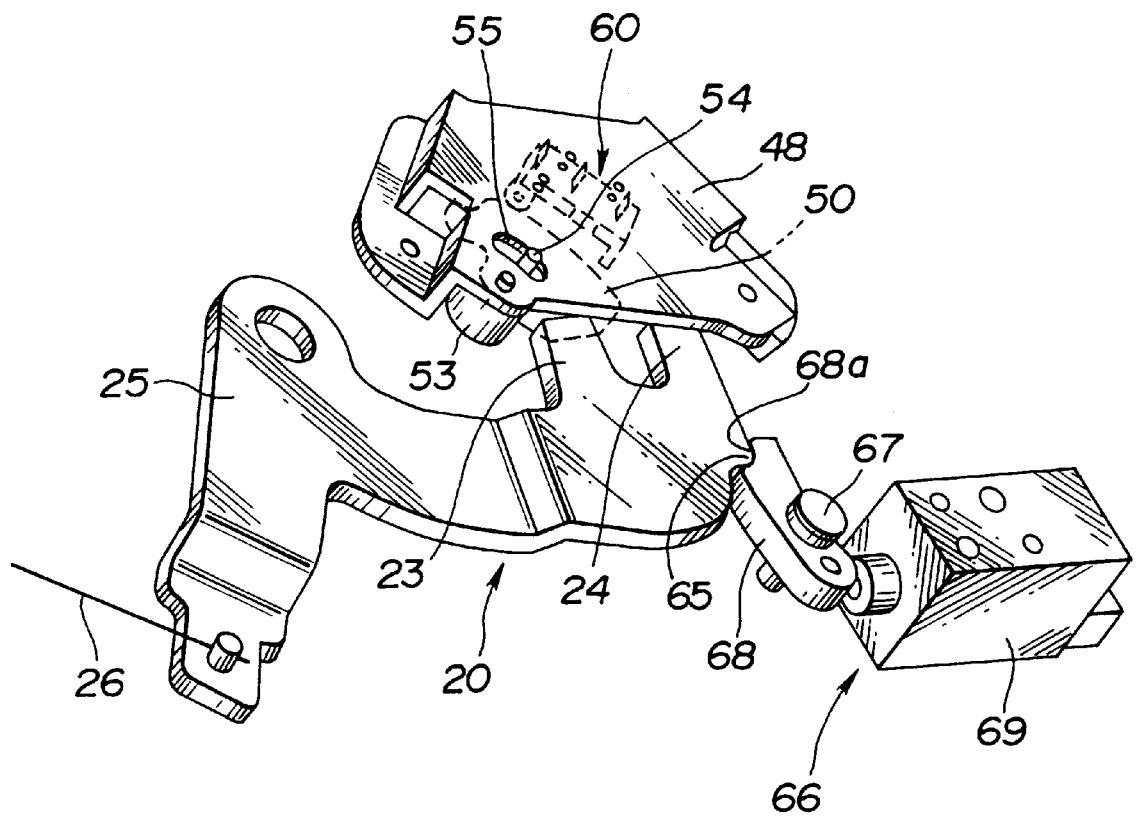
FIG. 5 is a perspective view of a locking mechanism incorporated in the rotation adjusting device of FIG. 2.

As shown in FIGS. 2 and 5, the latching arm 25 has at its outer periphery an engagement projection 65 for engagement with a locking mechanism 66. The locking mechanism 66 includes a locking arm 68 pivotally mounted on the horizontal plate portion 13 of the rotating disk 66 by means of a pivot 67 and formed with an engagement depression 68a for engagement with the engagement projection 65, and a spring offset type solenoid 69 for turning or rotating the locking arm 68.

The solenoid 69 has a spring offset reciprocating element 70 engaged with the locking arm 68. When the solenoid 69 is energized, the reciprocating element 70 retracts to engage the engagement depression 68a of the locking arm 68 with the projection 65 of the latching arm 25, placing the latching arm 25 into a locked condition. When the solenoid 69 is deenergized, the reciprocating element 70 projects to disengage the engagement depression 68a of the locking arm 68 from the engagement projection 65 of the latching arm 25, placing the latching arm 25 into a lock released condition.

A shift position sensor (not shown) is provided to a shift control mechanism (not shown) including the shift lever 80. The electromagnetic solenoid 69 is controlled so that when it is detected that the shift lever 80 is in a parking position the solenoid 69 is de-energized and when it is detected that the shift lever 80 is in a drive gear position other than the parking position the solenoid 69 is energized.

The operation of the vehicle seat assembly 1 according to the above described embodiment of the present invention will be described. Assuming that the seat 10 is now in a standard or predetermined forward position, the engagement teeth 23 and 24 of the latching arm 25 under this condition are engaged in the locking engagement holes 46 and 47 of the stationary guide 17, whereby the seat 10 is put into a locked condition.

For this reason, the tooth 23 of the latching arm 25 is inserted deeply into the inside of the tubular portion 31 of the stationary guide 17 and brought into contact with the engagement face 52d of the cam 50, rotating the cam 50 to counterclockwise about the pivot 51 and against the bias of the return spring 53, by the amount exceeding at least beyond the minimum insertion position $L_{MIN}$ shown in FIG. 4.

Accordingly, the second circular arc cam surface 52c of the cam 50 is brought into engagement with the engagement roller 61, bending the actuating element 62 and placing the microswitch 60 into a detected or ON condition.

When the microswitch 60 is put into a detected or ON condition, it supplies its output or electric signal to an electric locking mechanism (not shown) provided to the shift lever 80 and adapted to lock the shift lever 80 in the parking position when energized. The electric lock mechanism releases the shift lever from the locked condition when not energized, so that the shift lever 80 becomes capable of being shifted from the parking position into another drive position or a reverse position and is thus capable of starting driving or running of the vehicle.

When the shift lever is shifted from the parking position to another gear position, the solenoid 69 of the locking mechanism 66 is put into an energized condition to cause the actuating element 70 to retract. This causes the locking arm 68 to turn counterclockwise to engage the engagement depression 68a with the engagement projection 65 of the latching arm 25, preventing turning or rotation of the latching arm 25 into a lock releasing direction, and therefore the latching arm 25 is put into a locked condition.

On the other hand, when the vehicle is stopped and the shift lever is shifted to a parking position, the solenoid 69 of the locking mechanism 66 is put into a condition of being not energized, whereby the actuating element 70 is caused to protrude to turn the locking arm 68 clockwise. By this, the engagement depression 68a is disengaged from the engagement projection 65 of the latching arm 25 to put the latching arm into a condition of being capable of turning in a lock releasing direction.

When the lock release lever 27 is rotated under this condition, the wire 26 is pulled to turn the latching arm 25 clockwise so that the engagement teeth 23 and 24 are disengaged from the locking engagement holes 46 and 47 of the tubular portion 31 of the stationary guide 17 and moving apart from and outward of same. By this, the latching arm 25 is put into a lock released condition.

When the latching arm 25 is in a lock released condition, the cam 50 is turned or rotated clockwise under the bias of the return spring 53, and the engagement roller 61 of the microswitch 60 is brought into engagement with the first circular arc cam surface 52a by way of engagement with the inclined cam surface 52b, whereby the microswitch 60 is put into a de-energized condition.

Under this lock released condition, by applying a turning or rotating force to the seat 10, it becomes possible to turn or rotate the rotating disk 16 relative to the stationary guide 17 and thereby turn or rotate the seat 10 into a rearward position, i.e., in a position where the seat 10 faces reward of the vehicle.

After the seat 10 starts turning or rotating, the lock releasing lever 27 is released from its rotated position. This causes the engagement teeth 23 and 24 of the latching arm 25 to be brought into contact with the outer circumferential surface of the tubular portion 31. The latching arm 25, however is not put into a locked condition. When the seat 10 is put into a standard or predetermined rearward position, engagement teeth of a latching arm of the rearward setting latching mechanism 20 are engaged in locking engagement holes, whereby the seat 10 is put into a locked condition.

Thereafter, in case the vehicle is to be started, the lock release lever 27 is rotated to release the seat 10 from its locked condition and thereafter seat 10 is rotated. When the seat 10 is rotated into a standard or predetermined forward position, the engagement teeth 23 and 24 of the latching arm 25 are engaged in the locking holes 46 and 47 of the stationary guide 17, whereby the cam 50 is rotated counterclockwise to put the microswitch 60 into a detected or ON condition to enable the shift lever to shift from the parking position to another drive gear position while causing the latching arm 25 to be locked by the locking mechanism 66.

By the above described embodiment, when the seat 10 is rotated into a standard forward position to engage the engagement teeth 23 and 24 of the latching arm 25 in the locking holes 46 and 47 of the stationary guide 17, the engagement tooth 23 of the latching arm 25 is brought into contact with the engagement surface 52d of the cam 50 to rotate the cam 50, whereby the second circular arc cam surface 52c is brought into contact with the engagement roller 61 of the microswitch 60 to put the microswitch 60 into a detected condition for thereby making it possible to detect the locked condition of the seat 10 which is locked in its standard forward position accurately.

In this instance, even if there is an error in the attached or arranged positions of the latching arm 25, the cam 50 and the microswitch 60, insertion of the tooth 23 of the latching arm 25 beyond the minimally inserted position $L_{MIN}$ can assuredly put the microswitch 60 into the detected or ON condition, thus making it possible to detect the locked condition of the seat 10 that is locked in the standard forward position.

Further, when the shift lever 80 is shifted from the parking position to a drive gear position under the condition where the seat 10 is locked in the standard forward position, rotation of the latching arm 25 in a lock releasing direction is prevented by the locking mechanism 66, so that it becomes possible to prevent unintended or unexpected releasing of the seat 10 from its lock condition, assuredly.

While in the above described embodiment it has been described and shown that the latching arm 25 and the locking mechanism 66 are disposed on the rotating disk 16 side, with the locking holes 46 and 47, the cam 50 and the microswitch 60 being disposed on the stationary guide 17 side, such a positional relation can be reversed.

Further, while in the above described embodiment it has been described and shown that the locking through holes 46 and 47 are formed in the tubular portion 31 of the stationary guide 17, this is not for the purpose of limitation. Instead, but they can be replaced by notches or cuts in which the engagement teeth 23 and 24 of the latching arm 25 are engageable.

Further, while in the above described embodiment it has been described and shown that the rotating elements 42 and 44 are in the form of balls, they can be replaced by cylindrical rollers or tapered rollers.

Further, while in the above described embodiment it has been described and shown that the locking arm 68 is of a pivotal type but can be of such a type as to slide or reciprocate toward or away from the latching arm 25.

What is claimed is:

1. A vehicle seat assembly comprising:

a base adapted to be mounted on a floor of a vehicle; a seat; and a rotatable support interposed between said seat and said base for rotatably supporting said seat on said support, wherein said support comprises:

a stationary member in a fixed relation to said base, a rotatable member rotatable relative to said stationary member and secured to said seat for rotation therewith, a latching mechanism provided to one of said stationary member and said rotatable member and having an engagement tooth, a locking engagement portion provided to the other of said stationary member and said rotatable member, said locking engagement portion being engageable with said engagement tooth of said latching mechanism only when said seat is in a predetermined position to prevent said seat from rotating, a cam movable in accordance with an engagement condition under which said locking engagement portion and said engagement tooth of said latching mechanism are engaged with each other, and a detecting unit for detecting said engagement condition based on an amount of movement of said cam.

2. The vehicle seat according to claim 1, wherein said engagement tooth of said latching mechanism is engageable in said locking engagement portion only when said seat is in a predetermined forward position.

3. The vehicle seat according to claim 1, wherein said detecting unit comprises a microswitch having an actuating element, said cam being rotatable about a pivot and having a first circular arc cam surface capable contacting said actuating element of said microswitch but incapable of actuating said microswitch even when brought into contact with said actuating element, a second circular arc cam surface for actuating said microswitch when brought into contact with said actuating element, an inclined cam surface located between said first and second circular arc cam surfaces, and an engagement cam surface for contact with said engagement tooth of said latching mechanism, said second circular arc cam surface being brought into contact with said actuating element of said microswitch only when said engagement tooth inserted into said locking engagement portion assumes a position within a maximally inserted position and a minimally inserted position.

4. The vehicle seat assembly according to claim 1, further comprising a locking mechanism for locking said latching mechanism when said engagement tooth is engaged in said locking engagement portion.

5. The vehicle seat assembly according to claim 4, wherein said engagement tooth of said latching mechanism is engaged in said locking engagement portion only when said seat is in a forward position.

6. The vehicle seat assembly according to claim 4, wherein said locking mechanism adapted to be actuated to lock said latching mechanism when a shift lever of a vehicle is shifted from a parking position to a drive gear position.

7. The vehicle seat assembly according to claim 4, wherein said locking mechanism comprises a spring offset type electromagnetic solenoid and is operative to lock said latching mechanism when said solenoid is energized.

8. The vehicle seat assembly according to claim 7, wherein said latching mechanism comprises a pivotal lock release lever provided to said seat and a pivotal latching arm having said engagement tooth and operatively connected to said lock release lever, said engagement tooth of said latching arm being disengageable from said locking engagement potion by operating said lock release lever.

9. The vehicle seat assembly according to claim 8, wherein said locking mechanism further comprises a pivotal lever operatively connected to said solenoid and engageable with said latching arm.

10. The vehicle seat assembly according to claim 1, wherein said locking engagement portion comprises a through hole formed in the other of said stationary member and said rotatable member.

11. The vehicle seat assembly according to claim 1, wherein said base includes a slider for enabling said seat to move forward and rearward of the vehicle.

12. A vehicle seat assembly comprising:
    a base adapted to be mounted on a floor of a vehicle; a seat;
    a rotatable support interposed between said seat and said base for rotatably supporting said seat on said base, wherein said support comprises:
        a stationary member in a fixed relation to said base,
        a rotatable member rotatable relative to said stationary member and secured to said seat for rotation therewith, and
        a latching mechanism provided to one of said stationary member and said rotatable member and having an engagement tooth,
        a locking engagement portion provided to the other of said stationary member and said rotatable member, said locking engagement portion being engageable with said engagement tooth of said latching mechanism only when said seat is in a predetermined position to prevent said seat from rotating; and
        a locking mechanism for locking said latching mechanism when said engagement tooth is engaged in said locking engagement portion.

13. The vehicle seat assembly according to claim 12, wherein said engagement tooth of said latching mechanism is engaged in said locking engagement portion only when said seat is in a forward position.

14. The vehicle seat assembly according to claim 12, wherein said locking mechanism adapted to be actuated to lock said latching mechanism when a shift lever is shifted from a parking position to a drive gear position.

15. The vehicle seat assembly according to claim 14, wherein said locking mechanism comprises a spring offset type electromagnetic solenoid and is operative to lock said latching mechanism when said solenoid is energized.

16. The vehicle seat assembly according to claim 15, wherein said latching mechanism comprises a pivotal lock release lever provided to said seat and a pivotal latching arm having said engagement tooth and operatively connected to said lock release lever, said engagement tooth of said latching arm being disengageable from said locking engagement portion by operating said lock release lever.

17. The vehicle seat assembly according to claim 16, wherein said locking mechanism further comprises a pivotal lever operatively connected to said solenoid and engageable with said latching arm.

18. The vehicle seat assembly according to claim 12, wherein said locking engagement portion comprises a through hole formed in the other of said stationary member and said rotatable member.

19. The vehicle seat assembly according to claim 12, wherein said base includes a slider for enabling said seat to move forward and rearward of the vehicle.

20. A vehicle seat assembly comprising:
    a base adapted to be mounted on a floor of a vehicle;
    a seat; and
    a rotatable support interposed between said seat and said base for rotatably supporting said seat on said base,
    wherein said support comprises:
        a circular stationary guide in a fixed relation to said base,
        a rotating disk rotatable relative to said stationary guide and secured to said seat for rotation therewith, said rotating disk having a hollow locking engagement portion,
        a latching mechanism provided to said stationary guide and having an engagement tooth, said hollow locking engagement portion being engageable with said engagement tooth of said latching mechanism only when said seat is in a predetermined forward position to prevent said seat from rotating,
        a cam rotatable in response to a variation of an amount of insertion of said engagement tooth of said latching mechanism into said locking engagement portion, and
        a detecting unit for detecting said amount of insertion of said engagement tooth into said locking engagement portion based on an amount of rotation of said cam.

21. The vehicle seat according to claim 20, wherein said detecting unit comprises a microswitch having an actuating element, said cam being rotatable about a pivot and having a first circular arc cam surface capable contacting said actuating element of said microswitch but incapable of actuating said microswitch even when brought into contact with said actuating element, a second circular arc cam surface for actuating said microswitch when brought into contact with said actuating element, an inclined cam surface located between said first and second circular arc cam surfaces, and an engagement cam surface for contact with said engagement tooth of said latching mechanism, said second circular arc cam surface being brought into contact with said actuating element of said microswitch only when an amount of insertion of said engagement tooth inserted into said locking engagement portion is between a maximum amount and a minimum amount by which said engagement tooth is insertable into said locking engagement portion.

22. The vehicle seat assembly according to claim 20, further comprising a locking mechanism for locking said latching mechanism when said engagement tooth is engaged in said locking engagement portion.

* * * * *